(12) United States Patent
Uhlhorn et al.

(10) Patent No.: US 8,467,682 B2
(45) Date of Patent: Jun. 18, 2013

(54) RELIABLE LOAD-BALANCED MULTI-PHOTONIC STAR CONFIGURATION

(75) Inventors: Brian L. Uhlhorn, St. Paul, MN (US);
Howard J. Schantz, Inver Grove Heights, MN (US); Stephen M. Sohn, Shoreview, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 350 days.

(21) Appl. No.: 12/915,491

(22) Filed: Oct. 29, 2010

(65) Prior Publication Data

US 2012/0106960 A1 May 3, 2012

(51) Int. Cl.
*H04B 10/00* (2006.01)

(52) U.S. Cl.
USPC ............... 398/48; 398/51; 398/50; 398/58

(58) Field of Classification Search
USPC .................................. 398/2, 45–64
See application file for complete search history.

(56) References Cited

U.S. PATENT DOCUMENTS

| | | | | |
|---|---|---|---|---|
| 4,543,666 A | * | 9/1985 | Witte et al. | 398/63 |
| 4,708,424 A | * | 11/1987 | Marhic | 385/46 |
| 4,726,644 A | * | 2/1988 | Mathis | 385/24 |
| 4,873,681 A | * | 10/1989 | Arthurs et al. | 398/51 |
| 5,073,982 A | * | 12/1991 | Viola et al. | 398/61 |
| 5,146,514 A | * | 9/1992 | Birk | 385/24 |
| 5,282,257 A | * | 1/1994 | Ota | 385/46 |
| 5,361,254 A | * | 11/1994 | Storck et al. | 370/366 |
| 5,521,732 A | * | 5/1996 | Nishio | 398/51 |
| RE35,262 E | * | 6/1996 | Birk | 385/24 |
| 5,663,818 A | * | 9/1997 | Yamamoto et al. | 398/58 |
| 5,859,718 A | * | 1/1999 | Yamamoto et al. | 398/51 |
| 5,889,600 A | * | 3/1999 | McGuire | 398/50 |
| 6,272,270 B1 | * | 8/2001 | Okayama | 385/46 |
| 6,327,400 B1 | | 12/2001 | Harstead et al. | |
| 6,414,766 B1 | * | 7/2002 | Vinel et al. | 398/45 |
| 6,570,687 B2 | * | 5/2003 | Araki et al. | 398/101 |
| 6,778,548 B1 | * | 8/2004 | Burton et al. | 370/429 |
| 6,788,692 B1 | * | 9/2004 | Boudreau et al. | 370/400 |
| 6,889,010 B2 | * | 5/2005 | Trezza | 398/130 |
| 7,000,026 B2 | * | 2/2006 | Beshai et al. | 709/238 |
| 7,072,352 B2 | * | 7/2006 | Lebizay et al. | 370/425 |
| 7,298,974 B2 | * | 11/2007 | Tanobe et al. | 398/63 |
| 7,881,617 B2 | * | 2/2011 | Cohen et al. | 398/154 |
| 7,957,645 B1 | * | 6/2011 | Stevens et al. | 398/63 |
| 8,090,256 B2 | * | 1/2012 | Reisslein et al. | 398/3 |
| 8,233,798 B2 | * | 7/2012 | Levinson | 398/68 |
| 2002/0083195 A1 | * | 6/2002 | Beshai et al. | 709/238 |
| 2002/0085251 A1 | * | 7/2002 | Ofek et al. | 359/117 |
| 2004/0208625 A1 | * | 10/2004 | Beshai et al. | 398/161 |

(Continued)

OTHER PUBLICATIONS

U.S. Appl. No. 12/916,679, filed Nov. 1, 2010 (17 pages).

(Continued)

*Primary Examiner* — Agustin Bello
(74) *Attorney, Agent, or Firm* — Hamre, Schumann, Mueller & Larson, P.C.

(57) ABSTRACT

A photonic-based distributed network switch that utilizes multiple photonic broadcast stars and separate optical transmitters to improve overall reliability, allow load balancing, and provide failover for the network switch and the network with which the switch is used.

15 Claims, 5 Drawing Sheets

U.S. PATENT DOCUMENTS

| | | |
|---|---|---|
| 2005/0141892 A1 | 6/2005 | Park et al. |
| 2007/0110439 A1* | 5/2007 | Beshai et al. .................... 398/45 |
| 2008/0075460 A1* | 3/2008 | Islam .............................. 398/45 |
| 2008/0131122 A1* | 6/2008 | Reisslein et al. ................. 398/59 |
| 2009/0080887 A1* | 3/2009 | Levinson ......................... 398/58 |
| 2009/0290866 A1* | 11/2009 | Chung et al. ...................... 398/5 |
| 2010/0183298 A1 | 7/2010 | Biegert et al. |
| 2012/0106960 A1* | 5/2012 | Uhlhorn et al. ................. 398/63 |
| 2012/0106961 A1* | 5/2012 | Uhlhorn et al. ................. 398/63 |

OTHER PUBLICATIONS

U.S. Appl. No. 12/916,684, filed Nov. 1, 2010 (18 pages).

International Search Report for international application No. PCT/US2011/057987, dated Feb. 6, 2012 (3 pages).

Written Opinion of the International Searching Authority for international application No. PCT/US2011/057987, dated Feb. 6, 2012 (5 pages).

* cited by examiner

RELIABLE LOAD-BALANCED MULTI-PHOTONIC STAR CONFIGURATION

FIELD

This disclosure relates to a photonic-based distributed network switch useable in a broadcast-based photonic network.

BACKGROUND

FIGS. 1-3 illustrate a known photonic-based distributed switch 10 that employs a single passive photonic broadcast star 12 and a plurality of independent ports 14 connected to the star. FIGS. 2 and 3 show one of the ports 14 of the switch 10 as including an external interface channel 16 for interfacing to external host devices 18, a processor such as a field programmable gate array (FPGA) 20 connected to the interface channel 16 for processing optical data frames and determining which data frames to forward/receive to/from the external channel, a fixed wavelength optical transmitter 22 that outputs an optical signal containing data frames received over the interface channel 16 to the star 12 on one wavelength, and a multi-wavelength optical receiver 24 that receives multiplexed optical data streams from the star 12 and demultiplexes the received data streams.

In this known switch, the broadcast star is a single point of failure such that if the star 12 fails, the entire switch goes down.

SUMMARY

A photonic-based distributed network switch is described that utilizes multiple photonic broadcast stars to improve overall reliability, allow load balancing, and provide failover for the network switch and the network with which the switch is used.

To provide load balancing, a processor is provided to determine which broadcast star to route data to. The processor can distribute the data load among the multiple broadcast stars so that each star is functionally operative during use of the switch, instead of a backup star being primarily inoperative and only being used in the event of failure of a first, primary star. However, if one of the multiple stars happens to fail, the processor controls automatic failover so that all data is routed to the remaining operative star(s).

In one embodiment, a photonic-based distributed network switch includes first and second passive optical stars, and a plurality of independent ports each of which is connected to the first and second passive optical stars. Each port includes an external interface, and a processor connected to the external interface, where the processor includes a plurality of independent processing elements operating in parallel. For each port, first transmit and receive channels connect the first passive optical star to the processor, and second transmit and receive channels connect the second passive optical star to the processor. As used herein, independent processing elements operating in parallel includes, but is not limited to, multi-core processors, FPGAs, ASICs, DSPs and other similar devices.

In another embodiment, a photonic-based distributed network switch includes first and second passive optical stars, and a plurality of independent ports each of which is connected to the first and second passive optical stars. Each port includes an external interface configured to interface to a plurality of external devices, and a processor connected to the external interface. The processor includes a plurality of independent processing elements operating in parallel. Each port also includes a first multi-wavelength optical receiver connected to the first passive optical star and connected to the processor, and a second multi-wavelength optical receiver connected to the second passive optical star and connected to the processor. In addition, each port also includes a first fixed wavelength optical transmitter connected to the first passive optical star and connected to the processor, and a second fixed wavelength optical transmitter connected to the second passive optical star and connected to the processor.

DRAWINGS

DETAILED DESCRIPTION

Figure 1:
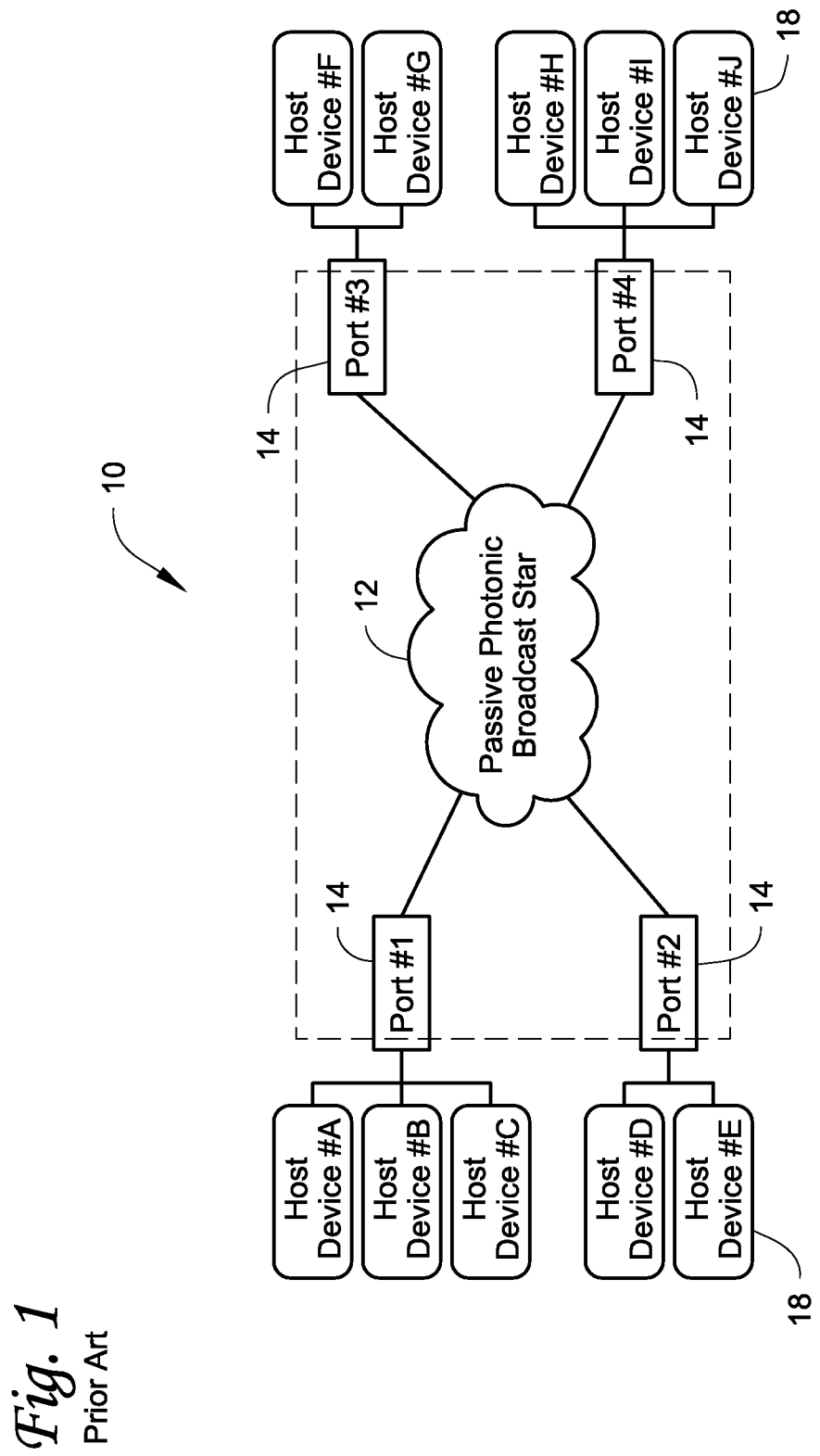
FIG. 1 illustrates a known photonic-based distributed network switch.
Figure 2:
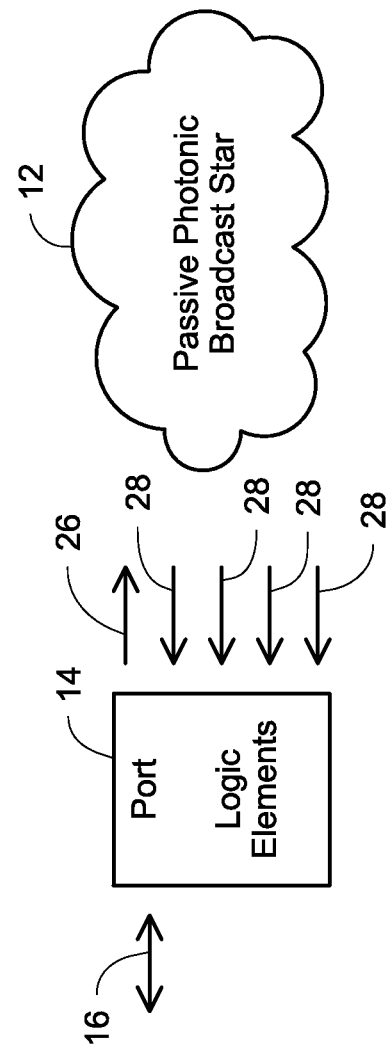
FIG. 2 illustrates the operational concept of each of the ports and the passive optical broadcast star of the photonic-based distributed network switch of FIG. 1.
Figure 3:
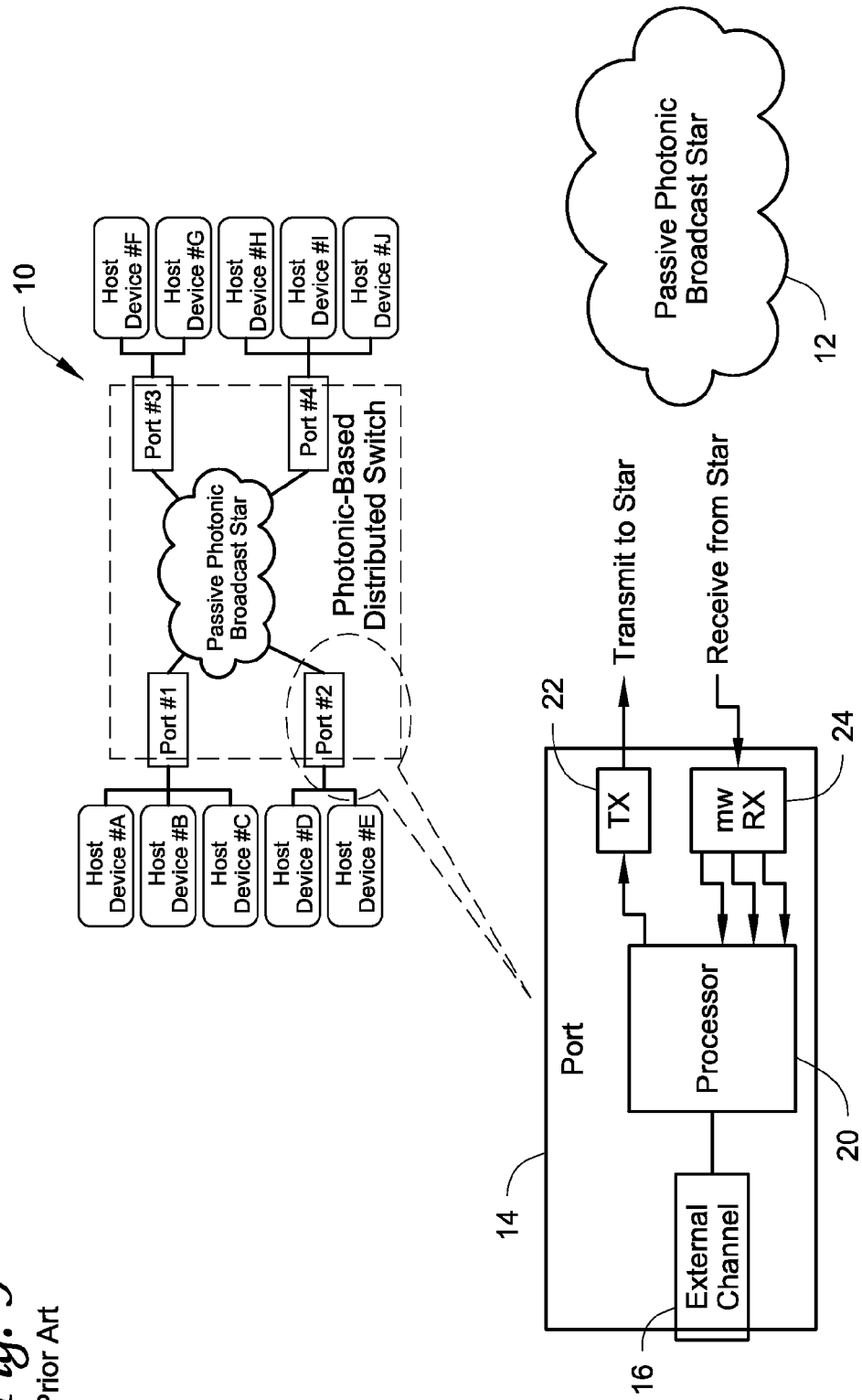
FIG. 3 illustrates the construction of one of the ports of the photonic-based distributed network switch of FIG. 1.

Referring to FIGS. 1-3 showing the known switch 10, the ports 14 are connected to and in communication with the passive broadcast star 12 to route data frames to and receive data frames from the star 12. The term data frame is used herein to refer generally to a discrete flow of data and the term is also intended to encompass a data packet. The data frames to and from the star 12 are optically formed data frames that are multiplexed in a data frame stream. The ports 14 connect the switch 10 to the external devices 18, such as computers.

Data signals to and from the external devices 18 are in the form of digital signals, while the data frames in the switch 10 are in the form of analog optical signals. The conversion to/from digital signals from/to optical signals can occur in the ports 14 using suitable conversion techniques.

With reference to FIGS. 1 and 2, the passive optical broadcast star 12 is a passive device that contains only passive optical components and no electronics. The broadcast star 12 replicates all data frames received from a respective port 14 on a one-way incoming transmit channel 26 from a respective port 14 onto multiple one-way outgoing receive channels 28 to the other ports. There is one channel 26 going to the star 12 from each port 14, and P channels from the star 12 to each port, with P being the total number of ports. A similar construction to that shown in FIGS. 2 and 3 is used for each port. The broadcast star 12 allows each port 14 to see all data frames for all ports 14. Therefore, any data frame that comes into for example port 2, is automatically received by the ports 1, 3 and 4 via the star 12.

The ports 14 include the interfaces and logic that actively process and forward data frames to and from the switch 10 and connect the switch to the external devices 18. The external channel 16 is a two-way channel that connects each port 14 to the external devices. The ports 14 operate independently of one another, with each port including the switching and protocol processing logic needed to perform network address resolution and data frame processing and forwarding.

In each port, the transmitter 22 outputs a single-wavelength optical signal on the one-way incoming channel 26 to the star 12, with the signal including the data frames received from the external devices 18 via the channel 16. The optical receiver 24 receives all traffic from the star 12 over the one-way outgoing channels 28 on a multiplexed data stream. The receiver 24 demultiplexes the data stream and routes the data to the processor 20 which processes all received traffic and selects data frames to be forwarded to the external devices 18 via the external channel 16.

The external devices 18 are connected to the ports 14 via conventional interface and protocol technology, such as Ethernet. FIG. 1 illustrates three external devices (for example computers A, B, C) connected to port 1, two external devices (for example computers D and E) connected to port 2, two external devices (for example computers F and G) connected to port 3, and three external devices (for example computers H, I and J) connected to port 4.

A problem with the switch 10 configuration is that the broadcast star 12 forms a single point of failure such that if the star fails, the entire switch goes down.

Figure 4:
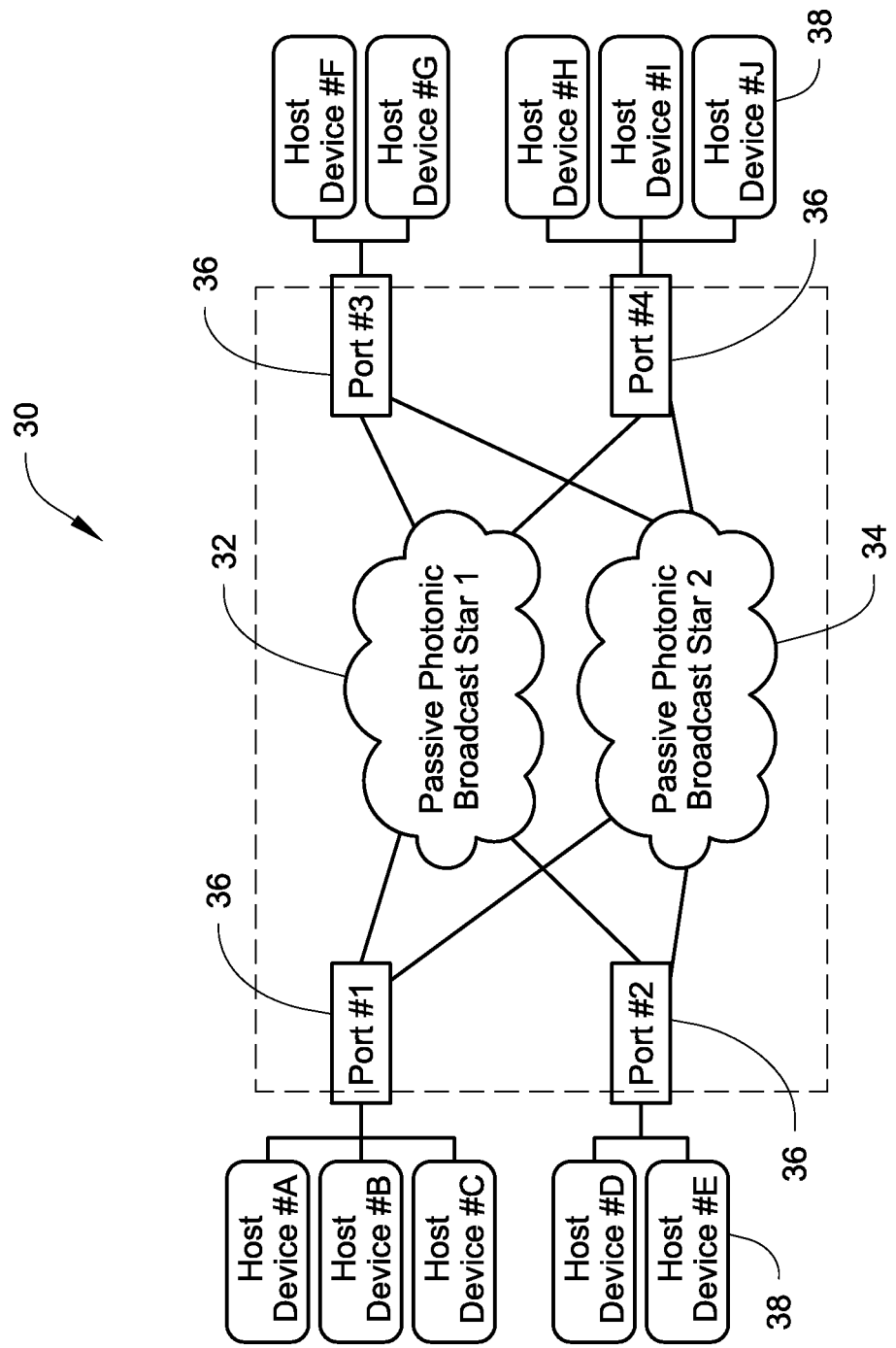
FIG. 4 illustrates a photonic-based distributed network switch that employs a plurality of passive optical broadcast stars.
Figure 5:
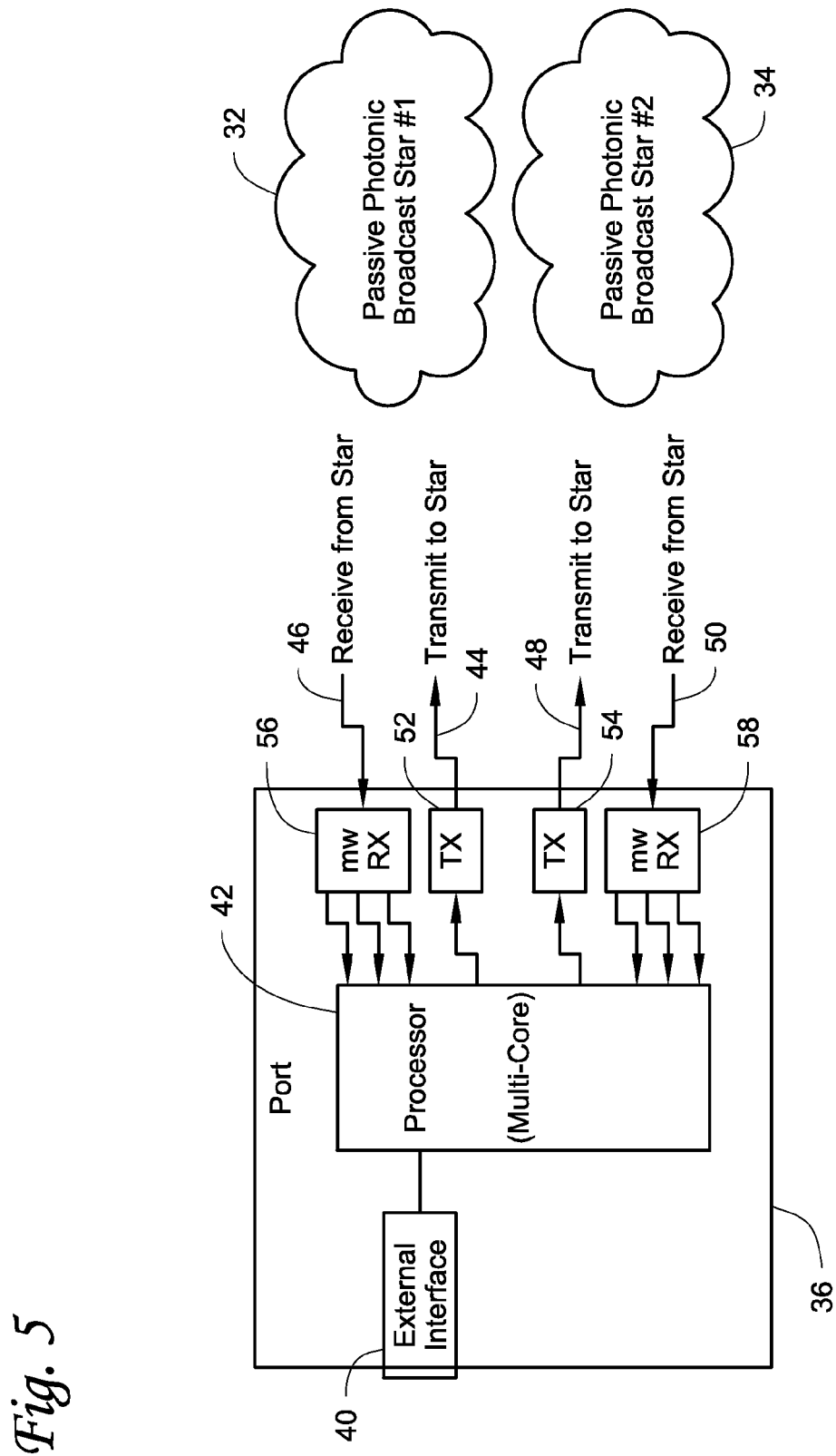
FIG. 5 illustrates the construction of one of the ports in the photonic-based distributed network switch of FIG. 4.

With reference to FIGS. 4-5, an improved photonic-based distributed network switch 30 is illustrated. The switch includes first and second passive optical stars 32, 34, and a plurality of independent ports 36 each of which is connected to the first and second passive optical stars. A plurality of external network-enabled devices 38 are connected to each port. The devices 38 can be any network-enabled devices including, but not limited to, computers, network routers, network switches, storage units, printers, sensor systems, plotters, and wireless access points.

The details of one of the ports 36 are illustrated in FIG. 5, it being understood that each port 36 is configured as shown in FIG. 5. The port 36 includes an external interface 40 for connecting the port to the external devices 38. A processor 42 is connected to the external interface 40. The processor 42 can be any type of processing element(s) that includes a plurality of independent processing elements operating in parallel. For example, the processor 42 can be a multi-core FPGA.

The processor 42 processes data frames and determines which data frames to forward to the external interface 40 for routing to the external devices 38. In addition, the processor is configured to determine which star 32, 34 to transmit data frames to, and to control automatic failover if one star 32, 34 fails.

First transmit and receive channels 44, 46 connect the first passive optical star 32 to the processor 42, and second transmit and receive channels 48, 50 connect the second passive optical star 34 to the processor. The first and second transmit and receive channels each comprise a fixed wavelength optical transmitter 52, 54 in the port and a multi-wavelength optical receiver 56, 58 in the port.

The optical transmitters 52, 54 receive multiplexed optical signals from the processor 42 and transmit the signals to their respective stars 32, 34. The transmitters 52, 54 can have the same data transmission speed or differing data transmission speeds. In addition, the transmitters 52, 54 can have respective individual data transmission speeds that differ from a data transmission speed of the external interface 40, or they can each have the same transmission speed as the interface 40. In one exemplary embodiment, the individual transmission speeds of the transmitters 52, 54 is each less than the transmission speed of the interface 40, but have a combined transmission speed that equals the transmission speed of the external interface. For example, if the interface 40 has a transmission speed of, for example 10 Gbps, each of the transmitters 52, 54 can have a transmission speed of 5 Gbps.

The use of the two transmitters 52, 54, together with the processor 42 having independent processing elements operating in parallel, permits load balancing. Load balancing refers to the simultaneous use of each star 32, 34 rather than exclusively using one star and using the other star solely as a standby or back-up. The processor 42 is programmed to determine which data, how much data and by which route, to transmit to the stars 32, 34. The processor 42 can employ any criteria for selecting the data to be transmitted and which transmission route to use. For example, the processor 42 can simply alternate between the transmitters 52, 54. In another example, the processor 42 can route data to the transmitters 52, 54 based on how busy the stars 32, 34 are. For example, if the star 32 is overly busy, the processor routes data through the transmitter 54 to go to the second star 34. In case of failure of one of the star 32, 34, the processor 42 also controls failover detection and corrective action so that all data flows to the remaining functioning star.

Therefore, the use of the two stars 32, 34 not only provides redundancy in case of failure of one of the stars, but actively using the two stars 32, 34 also improves performance of the switch 30.

The multi-wavelength optical receivers 56, 58 receive multiplexed optical data frame signals from the respective stars 32, 34, demultiplex the signals into separate data frames, and send the data frames to the processor 42.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A photonic-based distributed network switch, comprising:
   first and second passive optical stars, and a plurality of independent ports each of which is connected to the first and second passive optical stars; each port includes an external interface, and a processor connected to the external interface, the processor includes a plurality of independent processing elements operating in parallel; and each port further includes:
   first transmit and receive channels connecting the first passive optical star to the processor; and
   second transmit and receive channels connecting the second passive optical star to the processor.

2. The photonic-based distributed network switch of claim 1, wherein for each port, the first and second transmit and receive channels each comprise a multi-wavelength receiver and a fixed wavelength transmitter in the port.

3. The photonic-based distributed network switch of claim 1, wherein the processor comprises a multi-core processor.

4. The photonic-based distributed network switch of claim 3, wherein for each port, the multi-core processor is a multi-core field programmable gate array.

5. The photonic-based distributed network switch of claim 2, wherein for each port, the fixed wavelength transmitters have the same transmission speed or differing transmission speeds.

6. The photonic-based distributed network switch of claim 2, wherein for each port, the processor is configured to route all data through the fixed wavelength transmitter of the first transmit and receive channels if the second passive optical star fails.

7. The photonic-based distributed network switch of claim 2, wherein for each port, the processor is configured to balance the data transmission load of the fixed wavelength transmitters in the respective port.

8. The photonic-based distributed network switch of claim 2, wherein for each port, the fixed wavelength transmitters have respective individual transmission speeds that differ from a transmission speed of the external interface.

9. The photonic-based distributed network switch of claim 8, wherein the combined transmission speed of the fixed wavelength transmitters equals the transmission speed of the external interface.

10. A photonic-based distributed network switch, comprising:
   first and second passive optical stars, and a plurality of independent ports each of which is connected to the first and second passive optical stars;
   each port includes:
      an external interface configured to interface to a plurality of external devices;
      a processor connected to the external interface, the processor including a plurality of independent processing elements operating in parallel;
      a first multi-wavelength optical receiver connected to the first passive optical star and connected to the processor, and a second multi-wavelength optical receiver connected to the second passive optical star and connected to the processor; and
      a first fixed wavelength optical transmitter connected to the first passive optical star and connected to the processor, and a second fixed wavelength optical transmitter connected to the second passive optical star and connected to the processor.

11. The photonic-based distributed network switch of claim 10, wherein for each port, the first and second fixed wavelength optical transmitters have the same transmission speed or differing transmission speeds.

12. The photonic-based distributed network switch of claim 10, wherein for each port, the processor is configured to route all data through the first fixed wavelength optical transmitter if the second passive optical star fails.

13. The photonic-based distributed network switch of claim 10, wherein for each port, the processor is configured to balance the data transmission load of the first and second fixed wavelength optical transmitters so that each of the first and second fixed wavelength optical transmitters transmits data.

14. The photonic-based distributed network switch of claim 10, wherein for each port, the first and second fixed wavelength optical transmitters have respective individual transmission speeds that differ from a transmission speed of the external interface.

15. The photonic-based distributed network switch of claim 14, wherein the combined transmission speed of the first and second fixed wavelength optical transmitters equals the transmission speed of the external interface.

* * * * *